United States Patent [19]

Ladouceur et al.

[11] Patent Number: 5,090,440
[45] Date of Patent: Feb. 25, 1992

[54] LINE CLEANING APPARATUS

[75] Inventors: Jean Ladouceur, West Seneca; Kenneth H. Podmore, Rush, both of N.Y.

[73] Assignee: Legris Incorporated, Rochester, N.Y.

[21] Appl. No.: 604,822

[22] Filed: Oct. 26, 1990

[51] Int. Cl.⁵ .............................. B67D 1/07
[52] U.S. Cl. ....................... 137/209; 137/240; 137/512; 137/855; 222/148
[58] Field of Search ............. 137/240, 112, 113, 512, 137/209, 855; 222/148

[56] References Cited

U.S. PATENT DOCUMENTS

| | | | |
|---|---|---|---|
| 2,582,226 | 4/1946 | Doak | 137/240 X |
| 2,693,812 | 11/1954 | Jones | 137/113 |
| 3,260,274 | 7/1966 | Morgan | 137/113 |
| 3,460,168 | 8/1969 | Bruyne | 137/855 |
| 3,633,605 | 1/1972 | Smith | 137/113 |
| 4,527,585 | 7/1985 | Mirabile | 137/240 |
| 4,941,593 | 7/1990 | Hicks | 137/240 X |
| 5,572,230 | 2/1991 | Mirabile | 137/240 |

Primary Examiner—Alan Cohan
Attorney, Agent, or Firm—Howard J. Greenwald

[57] ABSTRACT

An apparatus for cleaning fluid lines is disclosed. This apparatus contains a fluid manifold, a valve, and a line connecting said fluid manifold and said valve. The valve used in the apparatus contains at least two input ports, at least two output ports, means responsive to fluid pressure for closing off the flow of liquid from a first of said ports, and means responsive to fluid pressure for opening the flow of liquid from a second of said ports.

19 Claims, 9 Drawing Sheets

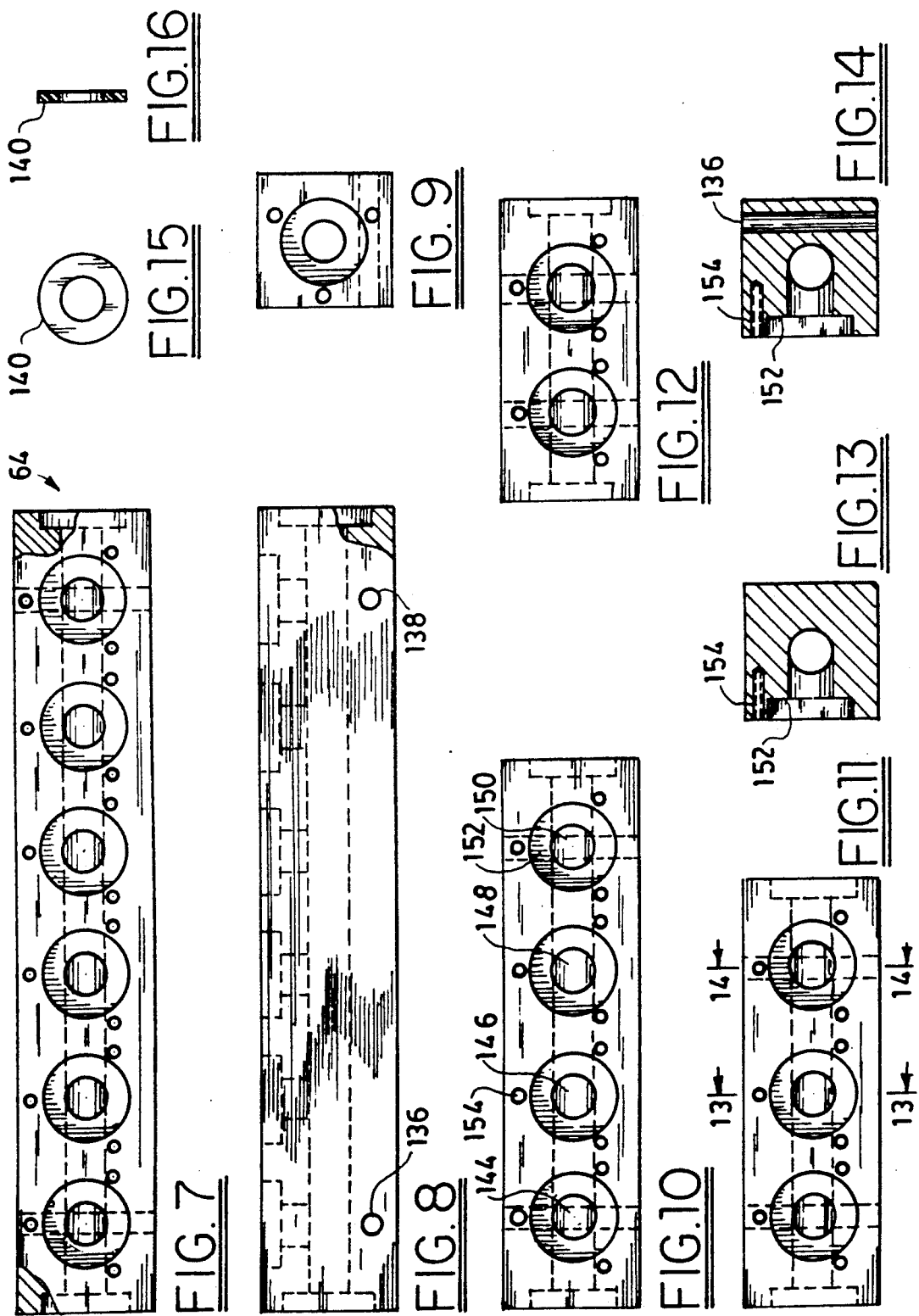

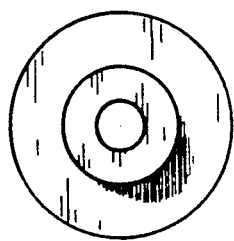 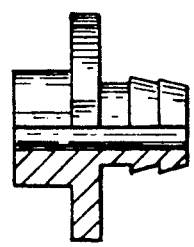 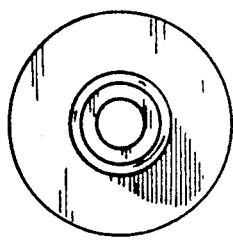
FIG.17B  FIG.17A  FIG.17C
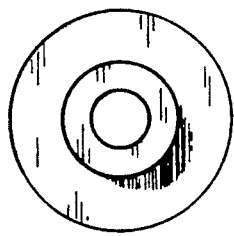 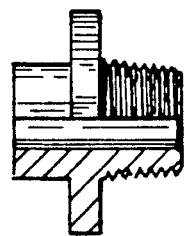 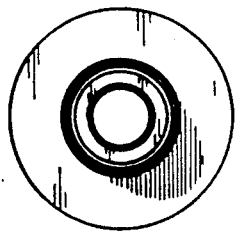
FIG.18B  FIG.18A  FIG.18C
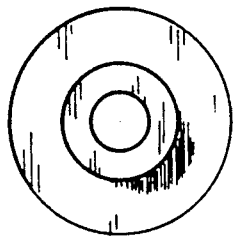 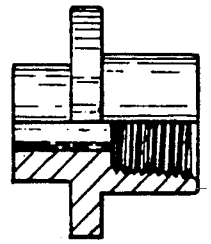 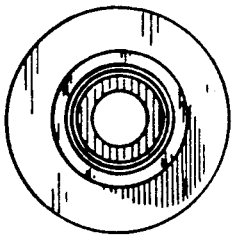
FIG.19B  FIG.19A  FIG.19C
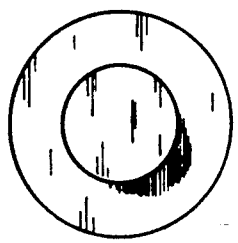 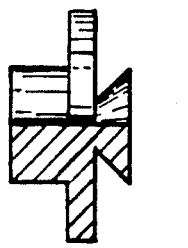 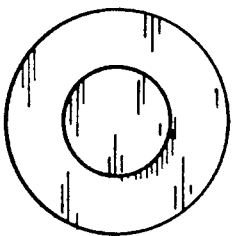
FIG.20B  FIG.20A  FIG.20C

LINE CLEANING APPARATUS

FIELD OF THE INVENTION

A conduit cleaning apparatus adapted to clean beer lines in order to prevent the build-up of yeast or "beer stone."

DESCRIPTION OF THE PRIOR ART

The usual beverage delivery system contains a source of the beverage (such as, for example, one or more kegs of draft beer), a source of pressure (such as a container of compressed carbon dioxide), and a conduit to carry the beverage to a discharge point having a manually activated spiggot.

The beverage to be discharged from the system should be at a temperature suitable for drinking. Thus, the beverage source is often stored in a temperature-controlled area. In most cases, the tube(s) carrying the beverage to the spiggot may be passed through a temperature-controlled area. In taverns, where draft beer is the beverage being delivered, the delivery system often contains a refrigerated room for the storage of beer kegs and a multiplicity of permanent tubes for connecting the kegs to distribution spiggots at a customer service area.

Draft beer is an unpasteurized food material which is surprisingly sensitive to rough handling. As is disclosed in U.S. Pat. No. 4,572,230 of Mirabile, organic materials present in the beer may chemically react or decompose, "beer stones" may precipitate out in the lines carrying the beer from the keg to the spiggot, and microbial action may degrade the beer. In his U.S. Pat. No. 2,092,257, Lewis teaches that "bacteria or fungus growths in beer cooling coils consist largely of moulds from the yeast used in making beer, acetic acid bacteria, and albumen."

The need to periodically clean beer lines in taverns was recognized at least as early as 1904. In his U.S. Pat. No. 774,461, Philip Wolfe disclosed a portable apparatus for cleaning beer, ale, water, and gas pipes. This device, which was carried on a movable frame, contained a water tank, a "combined compressed air and solution tank," and an air pump.

By 1944, many portable apparatuses for cleaning beer lines were in use, none of which were totally satisfactory. Thus, for example, in his U.S. Pat. No. 2,443,556, Michael J. Zwosta disclosed that " . . . the pipe cleaning operation in such dispensing apparatuses in general use today . . . is performed with special portable apparatus which necessitates disconnecting the pipe system from the beverage containers for cleaning and flushing. The operation is usually performed when the beverage dispensing system is not in use and when it is performed during service hours service is necessarily discontinued during the pendency of the operation. This method is poor at best; it does not encourage or permit of sufficiently frequent and sufficiently thorough cleaning operations to insure at all times the best sanitary and palatable conditions."

The apparatus of U.S. Pat. No. 2,443,550 was quite complicated, containing many couplings, pipes and valves. In his U.S. Pat. No. 2,583,982, Zwosta acknowledged that the device of his prior patent was impractical because " . . . the installation costs and problems which the patented apparatus involves . . . have rendered it somewhat difficult to introduce upon the market and it became . . . necessary to device simplified apparatus which might be installed in the average bar or saloon with very little difficulty and at very little cost."

However, the improved apparatus of Zwosta's U.S. Pat. No. 2,583,982 still left much to be desired. Zwosta's device apparently only could be used after a beer keg had been emptied of its contents, and its use required the disconnection and reconnection of various parts by the bartender. Thus, as disclosed in column 3 of U.S. Pat. No. 2,583,982, "When a keg of beer is emptied of its contents . . . , its beer rod 20 is withdrawn therefrom and its compressed air feed hose 19 is disconnected therefrom. The beer rod is then hooked up to the cleaning apparatus 25 . . . . At the conclusion of the cleaning operation, the beer rod is . . . detached from the cleaning apparatus and it is then inserted into a full, fresh keg of beer."

In 1953, in his U.S. Pat. No. 2,645,379, Benjamin Audia disclosed a permanently installed system for cleaning beer lines. However, Audia's system was complicated, expensive, and relatively large, containing a bulky mixer tank 8, a container 9 for cleaning solution, at least three mechanical valves 11, 12, and 14, at least two solenoid valves 17 and 26, a timer motor 22, and a timer controlled switch unit 23.

Another permanently installed system for cleaning beer lines was described in 1969 in U.S. Pat. No. 3,441,034 of Howard L. Burks. The system of this patent also is relatively complicated, containing a solenoid valve 15, a check valve 18, a regulator 22, a solenoid controlled water valve 23, a one-way valve 26, a pump 27, a motor 31, switch 42, timer 42, relay tube 45, card punch 78, and a card switch 48.

U.S. Pat. Nos. 4,527,585 and 4,572,230 of Mirabile also disclosed "permanently installed" system for cleaning beer lines. However, the devices of these patents appear to be at least as complicated as the prior art permanently installed systems; furthermore, each time the system is to be used, lines need to be connected to it and, after such use, disconnected. Thus, e.g., the system described in the 4,527,585 patent contains a solenoid valve 62, 64, and 86, a pump 60, a valve 82, hot water supply 72, and a one-way valve 88. The system of Mirabile, in order to function in most taverns, requires the installation of a separate drainage device. Even with the installation of such a separate drainage device, Mirabile's system cannot be used in all of the taverns in the United States and Europe, for many of the quick-tapping fittings used on beer kegs in such taverns are not adapted to connect to the "dual union 40" used in Mirabile's device.

Many of the prior art beer conduit cleaning apparatuses were constructed of material which tended to react with one or more of the substances which are initially present in the beer or are formed as one of its decomposition products. These prior art devices tended to be corroded by contact with the beer.

Most of the prior art beer line cleaning devices fail to provide an easy, inexpensive means for changing the pressure of the cleaning fluid used in cleaning the beer lines. This flexibility is desirable inasmuch as differing amounts of debris in the beer lines may require different amounts of fluid pressure to clean the lines.

To the best of applicant's knowledge, the prior art has not provided an efficient, economical means for cleaning beer lines. At this time, there is no permanently-installed system known to applicant in commercial use for regularly cleaning beer lines.

It is an object of this invention to provide a permanently installed beer line cleaning apparatus which is relatively simple and inexpensive and which need not be manually connected or disconnected each time it is used.

It is another object of this invention to provide a beer line cleaning apparatus which can be simply and readily activated manually and whose use will not cause a substantial reduction in the amount of time during which the beverage may be dispensed from the system.

It is yet another object of this invention to provide a beer line cleaning apparatus which is adapted to provide different levels of fluid pressure.

It is yet another object of this invention to provide a beer line cleaning apparatus which can be used frequently with relatively mild cleaning agents to effectively clean the beer lines.

It is yet another object of this invention to provide a beer line cleaning apparatus which will not substantially corrode when in contact with the beer.

It is yet another object of this invention to provide a beer line cleaning apparatus which may be used with substantially all of the beer kegs now in commercial use.

It is yet another object of this invention to provide a beer line cleaning apparatus which will not cause substantial frothing of the beer delivered from the system.

It is yet another object of this invention to provide a beer lining cleaning system whose use does not create a spillage of the beer.

It is yet another object of this invention to provide a beer line cleaning system which may be readily installed in most taverns without the necessity of providing additional drainage facilities.

SUMMARY OF THE INVENTION

In accordance with this invention, there is provided a process for cleaning beer lines with an apparatus containing a manifold with several orifices, a tube connected to at least one of said orifices, and a beer keg fitting containing a valve with at least two orifices. One of the orifices on the valve is connected to the manifold, and the other is connected to the beer keg. A source of water is connected to the manifold. When the source of water is turned on, water flows through the manifold and thence to the valve, it then causes the flow of beer from the keg to cease, and it flows out of the valve, into the beer lines, and to the spiggot, where it is discharged along with debris from the beer lines.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIGS. 7 and 8 are side and bottom elevational views, respectively, of a six-orifice manifold housing;

FIG. 9 is a right end elevational view of a manifold housing;

FIG. 10 is a front elevational view of a manifold housing;

FIG. 11 is a front elevational view of a three-orifice manifold housing;

FIG. 12 is a front elevational view of a two-orifice manifold housing;

FIGS. 13 and 14 are sectional views of the manifold of FIG. 11;

FIG. 15 is a front view of a rubber manifold fitting gasket;

FIG. 16 is a sectional view of a rubber manifold fitting gasket;

FIG. 17A is a partial sectional view of a barbed manifold fitting;

FIG. 17B is a left end elevational view of a barbed manifold fitting;

FIG. 17C is a right end elevational view of a barbed manifold fitting;

FIGS. 18A, 18B, and 18C are elevational views of a male pipe thread manifold fitting;

FIGS. 19A, 19B, and 19C are elevational views of a female pipe threaded manifold fitting;

FIGS. 20A, 20B, and 20C are elevational views of a manifold orifice plug;

DESCRIPTION OF THE PREFERRED EMBODIMENTS

Figure 1:
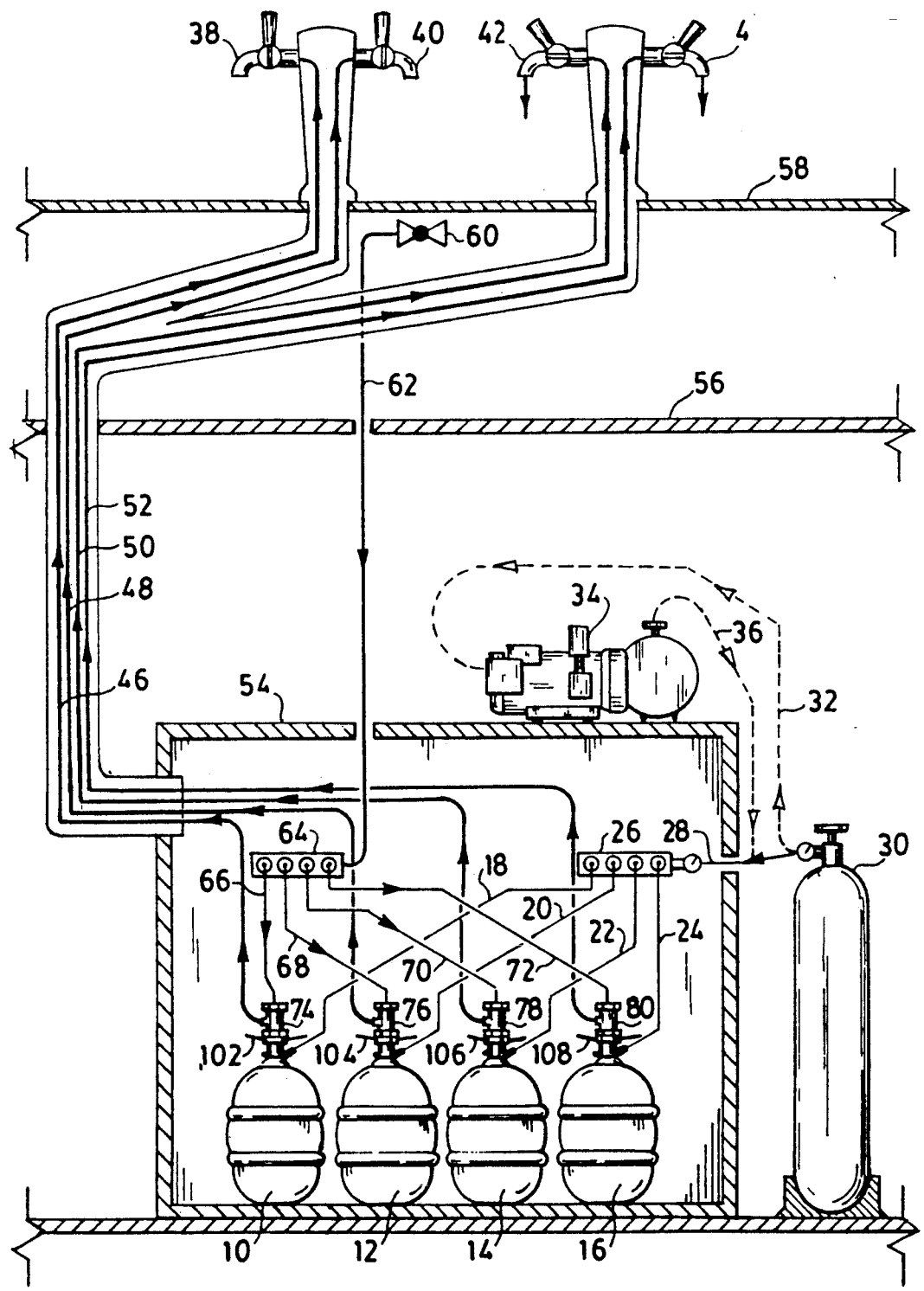
FIG. 1 is a schematic illustration of a beer dispensing system equipped with one preferred embodiment of applicant's beer line cleaning device.

A beer dispensing system utilizing applicant's beer cleaning apparatus is illustrated in FIG. 1.

Referring to FIG. 1, draft beer is stored in beer kegs 10, 12, 14, and 16. As is known to those skilled in the art, the beer kegs may be used with Sankey couplings, twin-probe couplings, European-style couplings, and the like. Unlike some of the prior art systems, applicant's system can be used with beer kegs equipped with any of the commercially available couplings.

Compressed gas lines 18, 20, 22, and 24 are connected to and extend from beer kegs 10, 12, 14, and 16, respectively; and lines 18, 20, 22, and 24 are also connected to compressed gas manifold 26.

The compressed gas used in the system may be compressed carbon dioxide, compressed air, or mixtures thereof. In general, the pressure of the compressed gas fed to the beer kegs is from about 7 to about 15 pounds per square inch.

Compressed gas may be fed via line 28 from a source of compressed gas 30; in the embodiment illustrated in FIG. 1, the source of compressed gas is a carbon dioxide cylinder. Alternatively, or additionally, compressed gas may be fed from compressed gas source 30 via line 32 to air compressor and reservoir 34 and thence via line 36 back through line 28 to compressed gas manifold 26.

In one preferred embodiment, illustrated in FIG. 1, compressed gas manifold 26 is similar to water manifold 64. As will be discussed later in this specification (see FIGS. 3 through 20C), the water manifold 64 is equipped with a multiplicity of manifold adaptors (see FIGS. 18A and 19A). In the preferred embodiment illustrated in FIG. 1, the manifold adaptors of the water manifold are replaced with one-way gas valves (not shown) in the gas manifold 26. The use of these one-way gas valves allows one to control the flow of compressed gas to the beer kegs 10, 12, 14, and 16.

In another embodiment, not shown, gas manifold 26 is substantially different in structure from water manifold 64.

When spiggots 38 and/or 40 and/or 42 and/or 44 are opened, beer is caused to flow through them as long as water valve 60 is closed. The flow of such beer is caused by the passage of the compressed gas through lines 18, 20, 22, and 24, and to beer kegs 10, 12, 14, and 16. The compressed gas in such beer kegs causes beer to flow through lines 46, 48, 50, and 52.

The beer kegs 10, 12, 14, and 16 must be kept in a cooler so that the beer dispensed from the spiggots will be drinkable. In a typical arrangement, illustrated in FIG. 1, the cooler 54 generally will be kept in the basement, below the floor 56 of the tavern, and the spiggots will be maintained above a counter top 58.

It is preferred to maintain the beer in the beer kegs at a temperature of from about 33 to about 35 degrees Fahrenheit. Temperatures outside of this range will tend to cause the beer to froth when it is dispensed through the spiggot.

The cleaning system of this invention is comprised of a source of water (not shown) connected to water valve 60. In general, the water supplied by most municipalities is usually at a pressure of from about 30 to about 80 pounds per square inch and, more commonly, at a pressure of from about 30 to about 45 pounds per square inch.

Water valve 60 is connected to water line 62 which, in turn, is connected to water manifold 64. Water valve 60 may be any of the one-way valves well known to those skilled in the art.

In one embodiment, not shown, water valve 60 is equipped with a water inlet line (not shown) a water outlet line 62, and a quick coupler (not shown). The quick coupler, which may be connected to the bottom 63 of valve 62, may be connected to a source of detergent and/or other cleaning chemical. Thus, in this embodiment, cleanser may be mixed with water in valve 60, and the cleaning solution or slurry thus formed may then be passed via line 62.

In the embodiment illustrated in FIG. 1, water valve 60 is in the open position. When water valve 60 is opened, and when the spiggots are open, water flows through line 62 to manifold 64.

If the spiggots are not open, water will not flow through the system even if water valve 60 is opened. Thus, referring again to FIG. 1, spiggots 42 and 44 are opened. Thus, water will flow through line 62 to water manifold 64 and thence to valves 78 and 80. When no water is flowing into such valves, then the compressed gas from source 30 forces beer from the kegs to flow to the spiggots. However, because of the unique construction of these valves, when water is flowing into such valves, beer is not allowed to flow out of the valve. Thus, when water valve 60 is turned on, beer ceases to flow through the beer delivery line attached to valves 78 and 80. Instead, water flows into the valves, out of the valves through the beer delivery line, and out of the spiggots 42 and 44, thereby cleaning such line.

By way of a comparison, and referring again to FIG. 1, since spiggots 38 and 40 are closed, the water flowing through line 62 does not cause valves 74 and 76 to close the kegs.

In one preferred embodiment, illustrated in FIG. 1, water line 62 is "beer hose." This material is well known to those skilled in the art.

The "beer hose" water line 62 preferably consists essentially of material which is approved by the Food and Drug Administration. It is also preferred that the water manifold 64 (and all of non-metallic parts in it) and the valves 74, 76, 78, and 80 (and all of the non-metallic parts in them) also consist essentially of materials approved by the Food and Drug Administration. As is known to those skilled in the art, the regulations describing the F.D.A. approved materials are set forth in Title 21, Code of Federal Regulations ("C.F.R.", section 177.2600), the disclosure of which is hereby incorporated by reference into this specification.

In one preferred embodiment, each of water line 62 and beer lines 66, 68, 70, and 72 consist essentially of an F.D.A. approved polyvinyl resin such as, e.g., polyvinyl chloride. These materials are well known to those skilled in the art. See, e.g., pages 583–587 of Volume 10 of the McGraw-Hill Encyclopedia of Science and Technology (McGraw-Hill Book Company, New York, 1977), the disclosure of which is hereby incorporated by reference into this specification.

It is preferred that the plastic material in water manifold 64 consist essentially of polyethylene which, preferably, is high density polyethylene. In one embodiment, the polyethylene has a density of from about 0.941 to about 0.959. Some of the components of the water manifold 64 (such as flat washers shown in FIGS. 15 and 16) are elastomeric materials which, preferably, consist essentially of an F.D.A. approved elastomer. One of the more preferred F.D.A. approved elastomers is "NORDEL" (an elastomer based upon the ethylene-propylene-hexadiene terpolymer which is sulfur-curable and which is sold by the E. I. Du Pont de Nemours Company of Wilmington, Del.

Referring again to FIG. 2, it will be seen that water manifold 64 comprises a multiplicity of stainless steel screws 84 which are preferably made from 316 stainless steel. The function of these screws 84 is to secure manifold adaptors to the water manifold 64.

Figure 2:
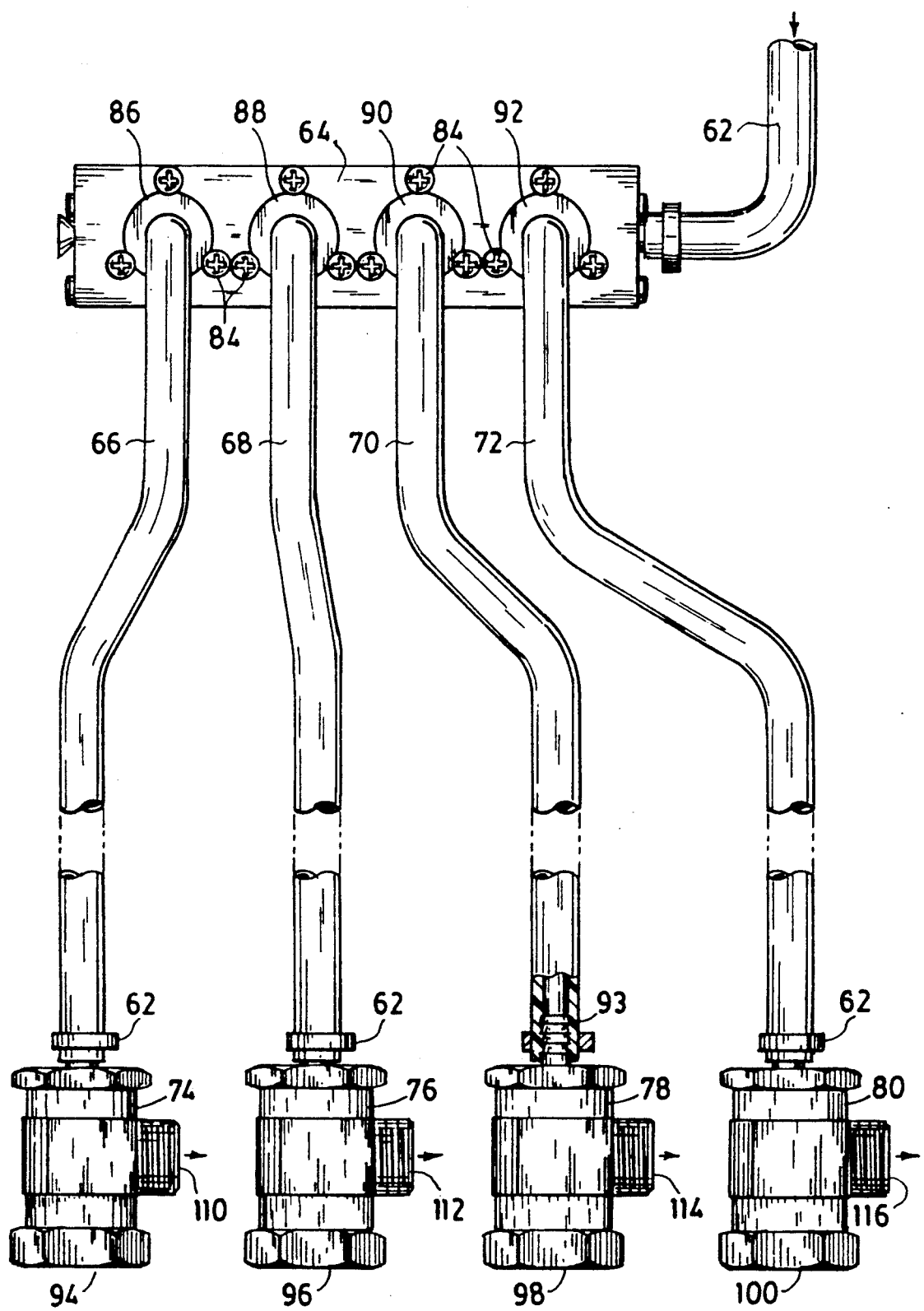
FIG. 2 is a partial perspective view of a portion of applicant's beer cleaning system, illustrating a water inlet hose, a manifold, and four valves.

FIG. 2 is a partial perspective view of a portion of applicant's preferred beer cleaning system, illustrating a water inlet hose, a manifold comprised of four orifices, and four flapper valves.

Water and/or cleaning solution is furnished to water manifold 64 through water line 62. In the embodiment illustrated in this Figure, clamp 82 secures the water line 62 to a barbed adaptor 93. Similar clamps are used to connect one end of lines 66, 68, 70, and 72 to flapper valves and 80. Similar clamps (not shown) are used to connect the other end of lines 66, 68, 70, and 72 to water manifold 64.

In the preferred embodiment illustrated in FIG. 2, ends 94, 96, 98, and 100 of flapper valves 74, 76, 78, and 80 are connected to the adaptors 192, 194, 106, and 108 (see FIG. 1) of beer kegs 10, 12, 14, and 16. Referring again to FIG. 2, beer enters the valves 74, 76, 78, and 80 through ends 94, 96, 98, and 100 and exists through orifices 110, 112, 114, and 116. However, when both water valve 60 and the spiggots 38, 40, 42, and 44 are opened, the beer ceases flowing through said orifices and water flows therethrough.

As will be apparent to those skilled in the art, the reasons that the water flow causes the beer to cease flowing is that the water pressure exceeds the pressure causing the beer to tend to exit the flapper valve.

Figure 3:
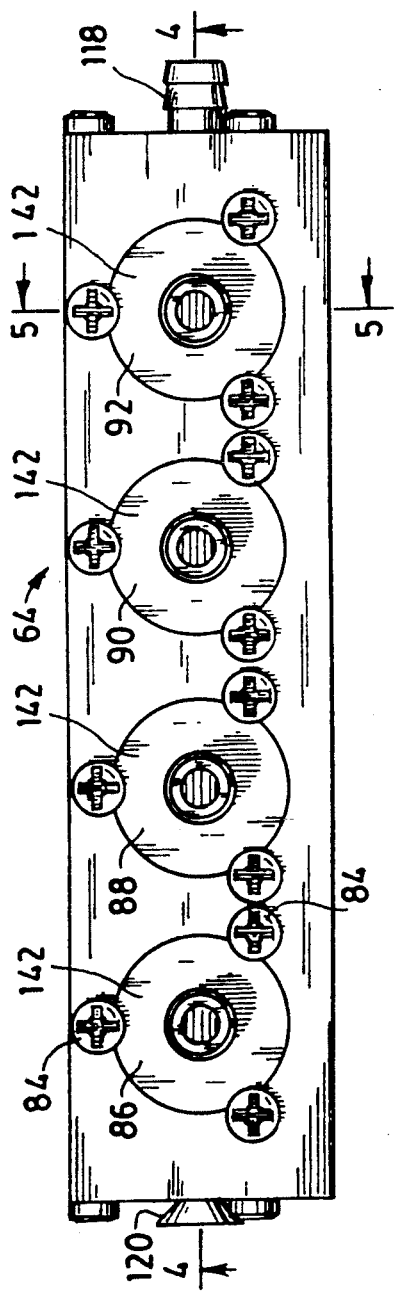
FIG. 3 is a front elevational view of the manifold shown in FIG. 2.

FIG. 3 is a front elevational view of a four-part manifold. Referring to FIG. 3, the manifold depicted therein is comprised of barbed manifold adaptors 86, 88, 80, and 92, and 118, each of which are shown in more detail in FIG. 17A. Manifold 64 also is comprised of plug adaptor 120, which is shown in more detail in FIG. 20B. The plug adaptor 120 may be used to plug any of the other orifices in manifold 64 after the barbed adaptors in said orifices are removed. Said adaptors may be readily removed from the manifold by unscrewing screws 84, which old them in place.

Figure 6:
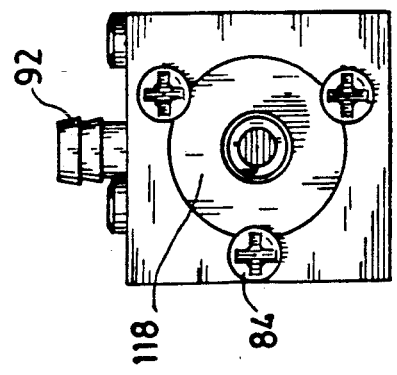
FIG. 6 is a right end elevational view of the manifold of FIG. 3.

One advantage of the embodiment illustrated in FIG. 6 is that, when a hose is connected to one of the adaptors by, e.g., being pushed over the barbed portion thereof, it often twists and kinks. By loosening the screws 84 holding such adaptor in place, one may swivel the adaptor until the hose is unkinked and then retighten screws 84.

Figure 4:
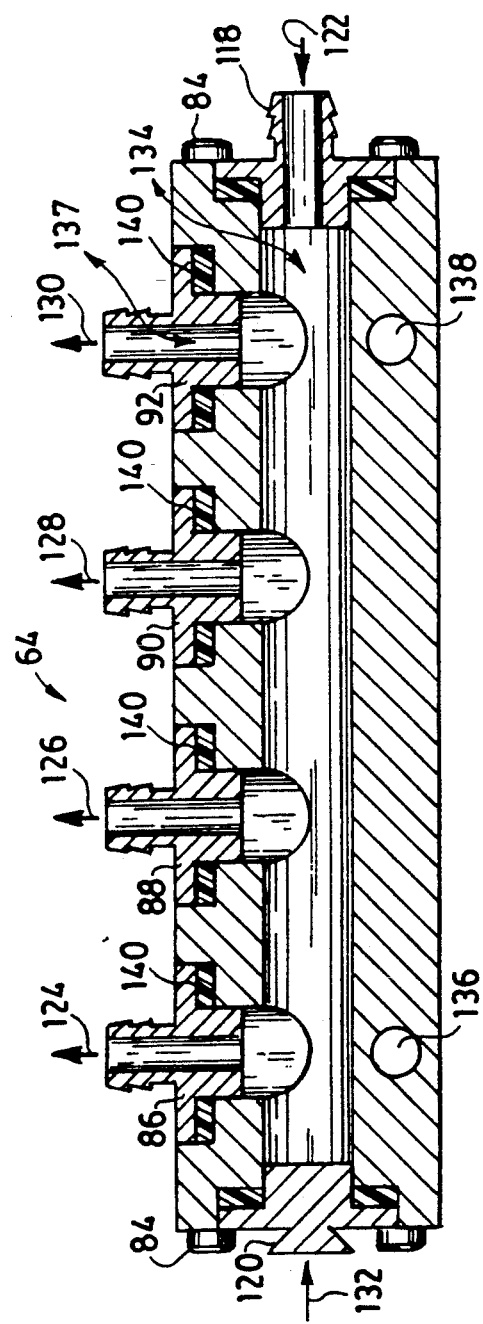

FIG. 4 is a cross-sectional view of the embodiment of FIG. 3, taken across lines 4—4. In the embodiment shown in FIG. 4, water and/or cleaning solution enters in the direction of arrow 122 and exits in the directions of arrows 124, 126, 128, and 130. It will be appreciated, however, that the input line may be any of adaptors 120, 86, 88, 90, 92, and 118. Thus, e.g., if one wished to put water into the adaptor in the direction of arrow 132, he would replace plug 120 with a barbed adaptor.

Figure 5:
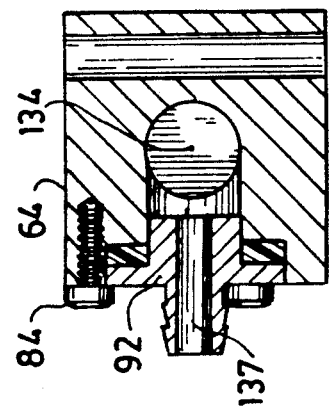
FIGS. 4 and 5 are sectional views of the manifold of FIG. 3.

FIG. 5 is a cross-sectional view of the embodiment of FIG. 3, taken across lines 5—5. Referring to FIG. 5, the water and/or cleaning solution flows through orifice and thence to passageway 136.

In the embodiment illustrated in FIGS. 4 and 5, screw holes 136 and 138 are provided. These screw holes may be used to attach the water manifold 64 to, e.g., the wall of a cooler.

Referring to FIG. 6, a right hand elevational view of a manifold, such as the one illustrated in FIG. 4, is shown.

In one preferred embodiment, illustrated in FIG. 4, the interior surfaces of manifold 64 are adapted to receive a flat washer 140. Thus, e.g., directing one's attention to adaptor 92, the orifice of manifold 64 is adapted to receive washer 140. The pressure exerted by tightening screw 84 onto collet 142 of the adaptor compresses washer 140 and helps create a water-tight seal within the manifold 64.

It is preferred to utilize a washer 140 which is thicker than the space between the adaptor and the interior surface of the manifold and the adaptor, thereby requiring the washer to be compressed.

It is preferred that washer 140 consist essentially of elastomeric material. The term elastomer, as used in this specification, refers to a macromolecular material that returns rapidly to approximately its initial dimensions and shape after substantial deformation of a weak stress and release of the stress.

FIG. 7 illustrates a water manifold 64 which is comprised of 6 orifices and adaptors suited to fit within said orifices. The manifold used in the apparatus of this invention must contain at least two such orifices and related adaptors. Inasmuch as most taverns do not have more than about 12 kegs in their beer delivery system, it is preferred that the manifold 64 contain from about 2 to about 12 such orifices and adaptors.

As will be apparent to those skilled in the art, the larger the number of orifices in manifold 64 which are being used to deliver water, or the larger the distance the water must travel to reach the manifold, the lower the pressure for any given diameter of water pipe 62. Thus, for example, when one is using a large number of orifices in the manifold and/or transporting the water/cleaner over a relatively long distance, the internal diameter of the water pipe 62 may be varied to affect either the water pressure and/or the flow rate, as desired.

FIG. 8 is a bottom elevational view of the six-orifice manifold of FIG. 7 illustrating mounting screw holes 136 and 138.

FIG. 9 is an right elevational view of a manifold housing shown without an adaptor fitted into the orifice. FIG. 10 is a front elevational view of a four-orifice manifold housing without adaptors fitted into orifices 144, 146, 148, and 150 and without screws screwed into screw holes 142. FIG. 11 is a similar view of a three-orifice manifold. FIG. 12 is a similar view of a two-orifice manifold.

FIG. 13 is a cross-sectional view, taken across lines 13—13 of FIG. 12. Referring to FIG. 13, the seat 152 onto which washer 140 fits is illustrated. The screw 84 (not shown) extends into screw hole 154 which is of sufficient length that the shoulder (not shown) of screw 84 (not shown) is substantially flush with the collet after the screw has been fully screwed into the screw hole 154.

FIG. 14 is a cross-sectional view, taken along lines 14—14 of FIG. 11, showing one of two manifold wall-mounting holes FIG. 15 is a front view of a typical elastomeric manifold fitting gasket. FIG. 16 is a side cross-sectional view of such gasket.

FIG. 17A is a partially sectioned side elevational view of a typical barbed manifold adaptor 86. It will be appreciated that the surfaces of the adaptor are configured to fit within the recess defined by washer 140.

FIG. 17B is a left end elevational view of a barbed fitting 86; shoulder 160 is adapted to fit within the recess defined by washer 140. Fluid flows within orifice 162. Support plug 164 is adapted to fit within the orifice of the manifold. After plug 164 is pressed into the manifold, it may be firmly secured therein by having screws 84 (not shown) attach it to the manifold.

FIG. 17C is a right elevational view of a barbed manifold fitting. FIGS. 18A, 18B, and 18C are elevational fittings of a typical male pipe thread manifold fitting. FIGS. 19A, 19B, and 19C are similar elevational views of a typical female pipe thread manifold fitting. FIGS. 20A, 20B, and 20C are similar elevational views of a manifold orifice plug.

The Valve Used in the Apparatus of the Invention

One of the essential parts of this invention is the use of a flapper valve in applicants' apparatus. As used in this specification, the term "flapper valve" refers to a valve which contains at least two input ports, at least two output ports, means responsive to fluid pressure for shutting off one of said ports, and means responsive to fluid pressure to opening one of said ports.

Figure 21:
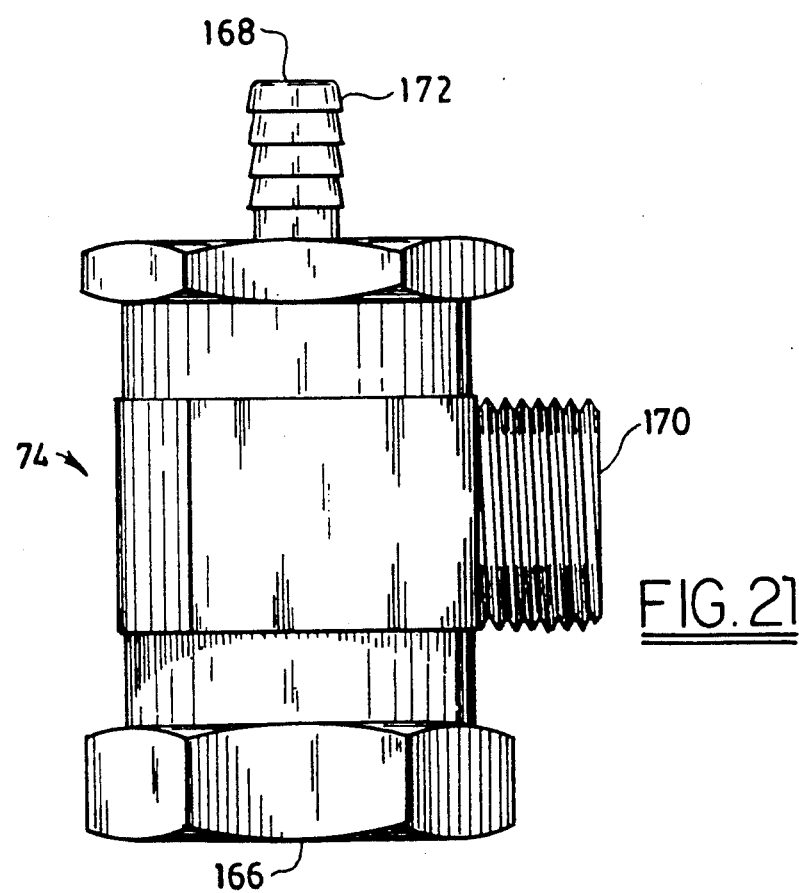

One of the preferred flapper valves used in the apparatus of this invention, valve 74, is illustrated in FIG. 21. At least about 90 about weight percent of flapper valve 21 is comprised of high density polyethylene. The remainder of the material in said valve is preferably comprised of elastomeric material, which appears in the flappers and the gaskets of the preferred valve. It is preferred that each of these materials be F.D.A. approved materials.

Referring again to FIG. 21, the preferred flapper valve illustrated therein contains beer input port 166, water input port 168, and output port 170. When beer is flowing into port 166 and water is simultaneously flowing into port 168, the fluid which has the higher pressure will flow out of port 170. Inasmuch as the pressure of the beer is from about 7 to about 15 pounds per square inch and the pressure of the water is at least 30 pounds per square inch, water will flow out of port 170, and will also seal the flow of the beer through the valve, when both fluids are attempting to flow into the valve.

Figure 22:
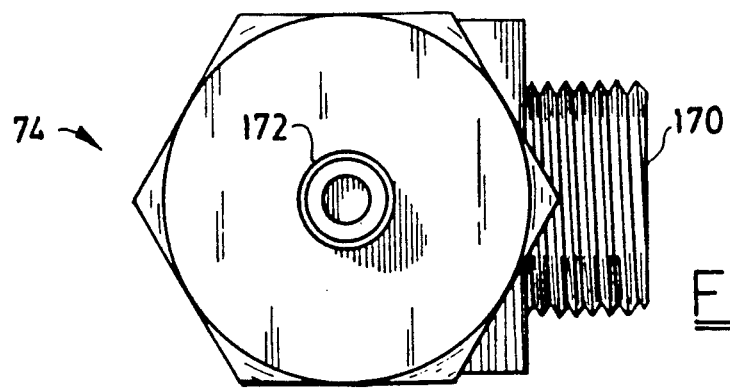
FIGS. 21, 22, and 23 are elevational views of one of the valves illustrated in FIG. 2.

FIG. 22 is a top view of the flapper valve of FIG. 21, showing a barbed extension 172 to which water line 66 (not shown) may be attached.

Figure 23:
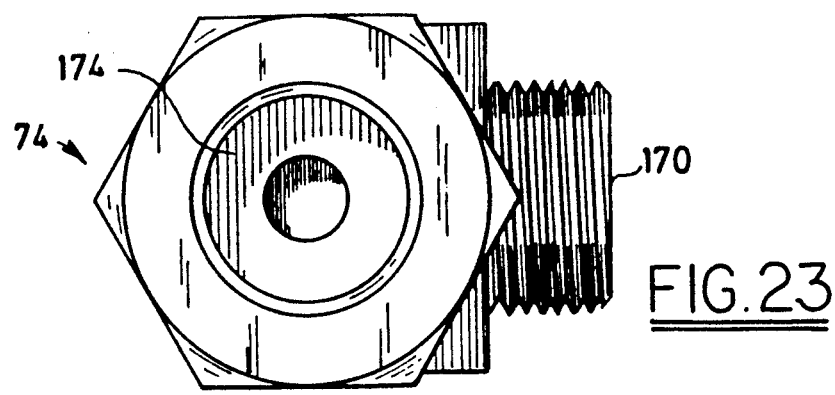

FIG. 23 is a bottom elevational view of the valve of FIG. 21, showing a interior threaded portion 174 into which a a male adaptor 102 which is attached to the beer keg 12 may be inserted. In one embodiment, not shown, an elastomeric washer (not shown) is inserted into the seat of the interior threaded portion. Furthermore, washers may be used to connect hoses to output port 170.

Figure 24:
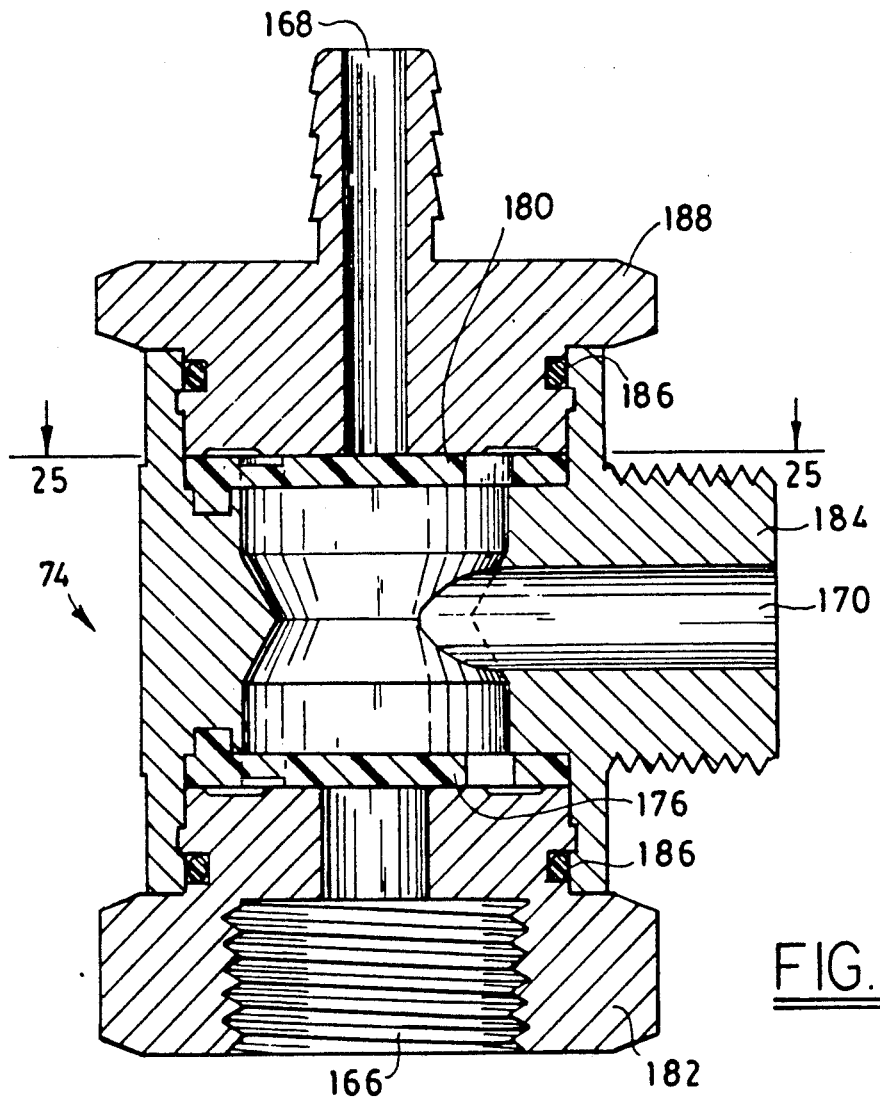
FIGS. 24, 25, 26, and 27 are sectional views of the valve of FIG. 23.

FIG. 24 is a longitudinal cross-sectional view of the flapper valve 74 of FIG. 21. When both beer and water flow into their respective ports, they both impinge a flapper. Referring to FIG. 24, beer flows through its input port 166 and contacts flapper 176. Water flows through its input port 168 and contacts flapper 180. The beer input port is defined by a female threaded port 182 which is force fitted into the main body 184 of the flapper valve 74. An elastomeric O-ring 186 is used to help seal port 182 within body 184.

The water input port is defined by a male barbed extension 188 which is force fitted into the main body 184 of the flapper valve 74. An elastomeric O-ring 186 is used to help seal port 182 within body 184.

Figure 25:
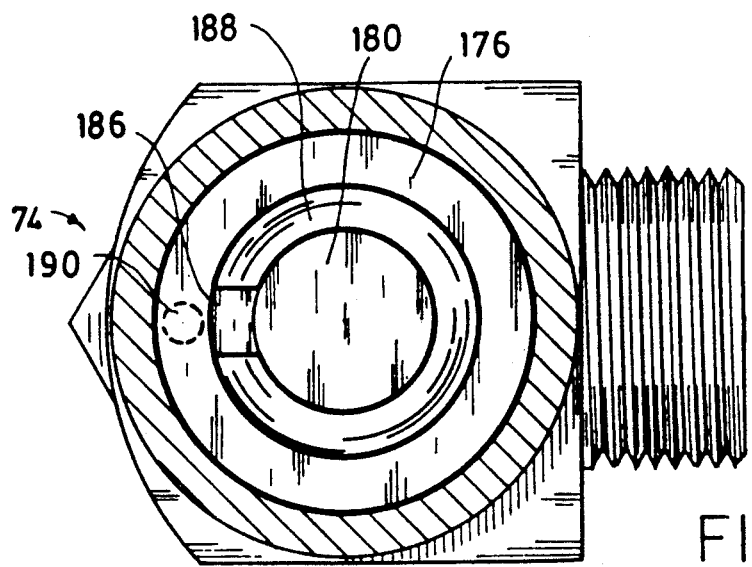

FIG. 25 is a cross-sectional view taken along lines 25—25 of FIG. 24. Referring to FIG. 25, flapper 180 is comprised of annular portion 182, annular portion 184, and flapper elbow 186. Thus, flapper 180 is defined by two substantially concentric circles joined together by elbow 186. The annular space between annular portion 182 and annular portion 184 allows annular portion 184 to flap back and forth in response to fluid pressure.

Flapper 180 is equipped with a projection (not shown) which is adapted to fit within a hole which is in the interior surface of the input port. One such hole is within the interior surface of the beer input port, and one such hole is within the interior surface of the water input port. The flapper assembly may be aligned in its respective port by rotating the assembly until the projection is force fitted into the hole it is adapted to enter.

Figure 26:
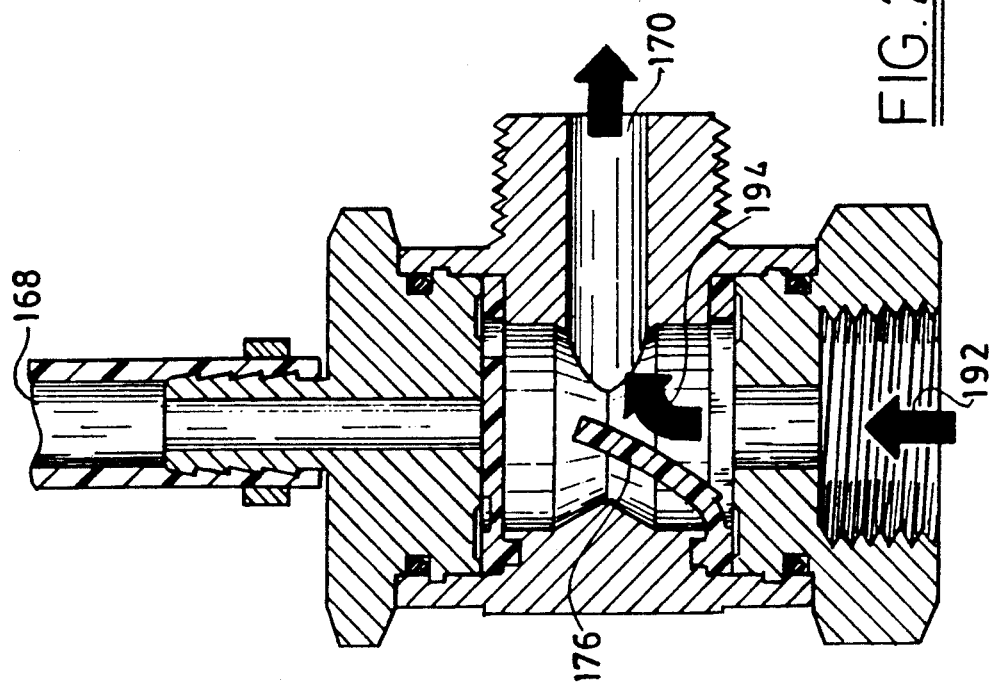

FIG. 26 is a longitudinal cross-section of the flapper valve of FIG. 21. In the embodiment illustrated in this Figure, no water is flowing into input port 168. Thus, in response to the pressure from the pressurized gas, beer flows in the direction of arrow 192, causes flapper 176 to be upwardly displaced in the direction of arrow 194, and allows the flow of beer through output port 170.

Figure 27:
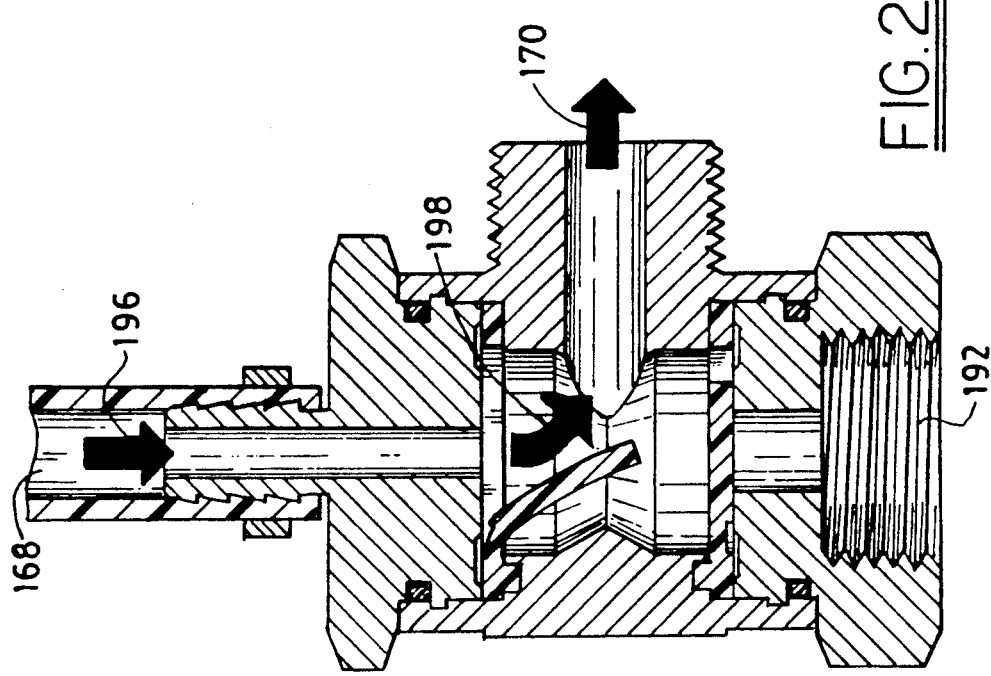

FIG. 27 is a longitudinal cross-section of the flapper valve of FIG. 21. In the embodiment illustrated in this Figure, no beer is flowing into input port 192. Thus, in response to the water pressure, water flows in the direction of arrow 192, causes flapper 180 to be downwardly displaced in the direction of arrow 1984, and allows the flow of beer through output port 170.

In another embodiment, not shown, beer is flowing into port 192 and water is flowing into port 168. In this embodiment, because of the larger pressure of the water, flapper 176 is kept closed and water flows out of port 170.

Figure 28:
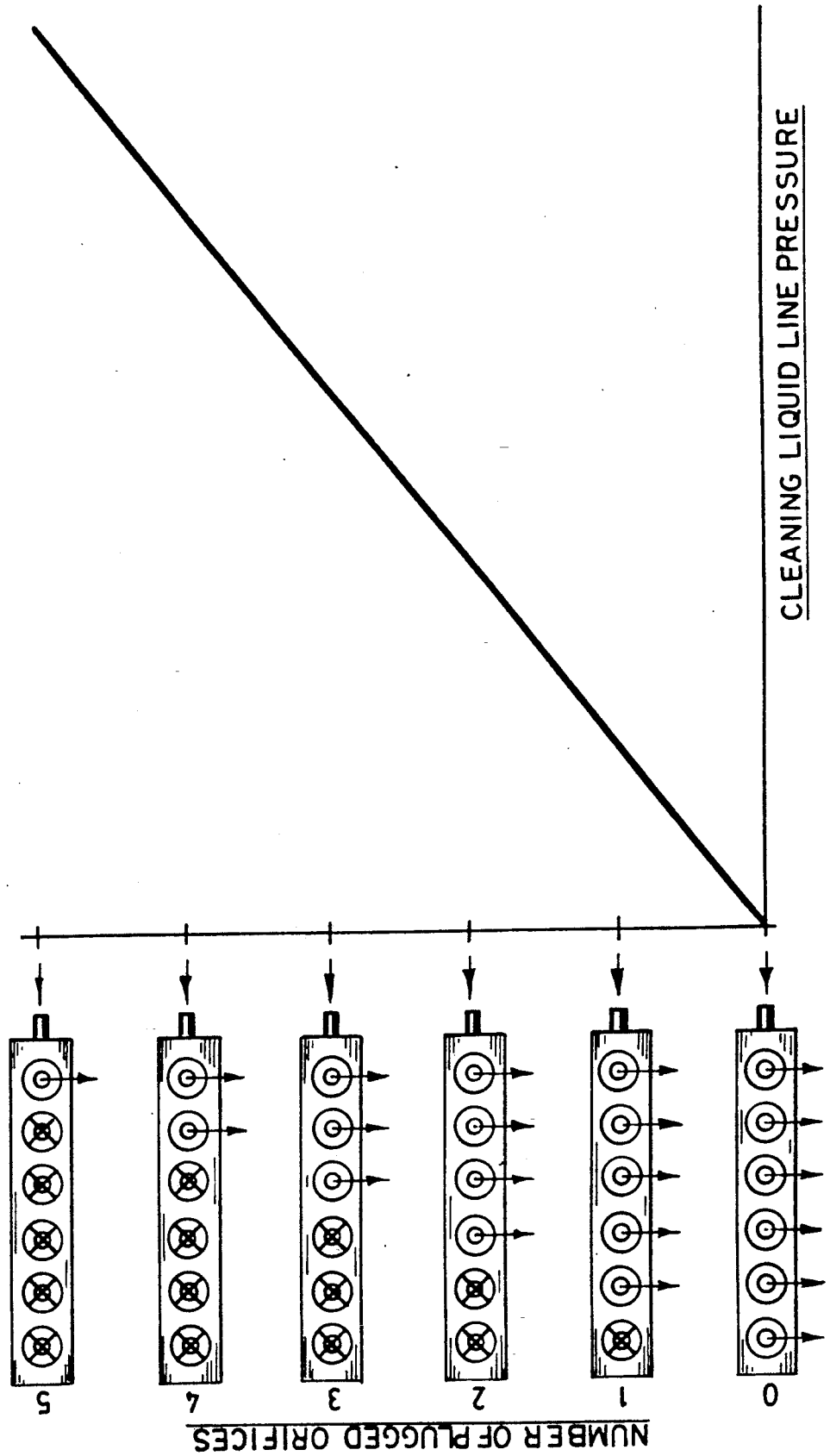
FIG. 28 is a graph illustrating the relationship between the number of manifold orifices which are opened in the manifold versus the pressure of the cleaning fluid delivered from the manifold.

FIG. 28 illustrates how, with the use of a given water manifold 64 and a given water input pressure, one may vary the water pressure delivered from the water manifold 64 to the flapper valve(s). In the embodiment denoted as "0" in FIG. 28, all of the orifices in the water manifold are open, and water is flowing through them to the flapper valve(s). In this embodiment, the water pressure is relatively low.

In the embodiment denoted as "1" in FIG. 28, one of the water manifold orifices is plugged with plug 120. In the embodiment denoted as "2" in FIG. 28, two of the water manifold orifices are plugged with plug 120. In the embodiment denoted as "3" in FIG. 28, three of the water manifold orifices are plugged with plug 120. In the embodiment denoted as "4" in FIG. 28, four of the water manifold orifices are plugged with plug 120. In the embodiment denoted as "5" in FIG. 28, five of the water manifold orifices are plugged with plug 120. It will be appreciated that, by choosing to plug up one or more of the orifices of the water manifold 64, one can change the water pressure delivered from said manifold.

In applicants' apparatus it is preferred that all of the interior surfaces of the valves, manifolds, and pipes be as smooth as possible and not contain any crevices or irregular surfaces on which particles and/or bacteria may gather.

It is to be understood that the aforementioned description is illustrative only and that changes can be made in the apparatus, the ingredients and their proportions, and in the sequence of combinations and process steps as well as in other aspects of the invention discussed herein without departing from the scope of the invention.

Thus, other flapper valves may be used in the apparatus of the invention. By way of illustration, a flapper valve comprised of a ball which, in response to fluid pressure from either the water and/or the beer, will seal one or the other of two passageways each defined by an O-ring, may also be used.

In one embodiment, the flapper valve 74 consists essentially of clear plastic so that an operator can visually determine what fluid is flowing through the valve.

In another embodiment, the manifold 74 and the barbed adaptors are integrally connected to each other to form a one-piece assembly.

In another embodiment, the apparatus of this invention may be used to deliver fluids such soft drink beverages, wines (which often are sold in kegs), chemicals, and the like. It will be appreciated that, as the nature of the fluid being delivered changes, the plastic material from which the apparatus is made also might change.

In one embodiment, valves consisting essentially of high-density polyethylene are provided. These valves are useful for the food and beverage industry.

What is claimed is:

1. A beverage delivery system for delivering beverage for a beverage source through conduits to a dispenser, wherein said beverage delivery system is comprised of a beverage container, a dispensing outlet, a source of compressed gas, means for connecting said compressed gas to said beverage container, a source of pressurized water, a fluid manifold comprised of an input port and an output port, a flapper valve, and means for connecting said input port of said fluid manifold to said source of pressurized water, wherein:

(a) said fluid manifold is comprised of three orifices;

(b) at least about 90 weight percent of the material in each of said fluid manifold, said flapper valve, and said line is comprised of nonmetallic material;

(c) said flapper valve is comprised of a first input port, a second input port, an output port, a first resilient flapper comprised of a first movable flap, means for disposing said first movable flap over said first input port of said flapper valve, a second resilient flapper comprised of a second movable flap, means for disposing said second movable flap over said second input port of said flapper valve, means responsive to fluid pressure for moving said first flap away from said first input port of said flapper valve, and means responsive to fluid pressure for moving said second flap away from said second input port of said flapper valve;

(d) said first input port of said flapper valve is connected to said output port of said fluid manifold;

(e) said second input port of said flapper valve is connected to said beverage source; and (f) said output port of said flapper valve is connected to said dispensing outlet.

2. The beverage delivery system as recited in claim 1, wherein said flapper valve is comprised of at least one gasket.

3. The beverage delivery system as recited in claim 2, wherein said gasket is elastomeric.

4. The beverage delivery system as recited in claim 1, wherein said flapper valve is comprised of at least two gaskets.

5. The beverage delivery system as recited in claim 4, wherein each of said gaskets is elastomeric.

6. The beverage delivery system as recited in claim 1, wherein each of said flappers is comprised of two substantially concentric annular portions of elastomeric material.

7. The beverage delivery system as recited in claim 1, wherein each of said flappers is comprised of a projection adapted to fit within a hole.

8. The beverage delivery system as recited in claim 7, wherein said flapper valve is comprised of at least one orifice adapted to receive said projection on said flapper.

9. The beverage delivery system as recited in claim 8, wherein said flapper valve is comprised of at least two orifices, each one of which is adapted to receive one of said projections on said flappers.

10. The beverage delivery system as recited in claim 1, wherein said system is comprised of a gas manifold which comprises at least about 90 weight percent of nonmetallic material.

11. The beverage delivery system as recited in claim 1, wherein at least about 90 weight percent of said fluid manifold is comprised of polyethylene.

12. The beverage delivery system as recited in claim 1, wherein at least about 90 weight percent of said flapper valve is comprised of polyethylene.

13. The beverage delivery system as recited in claim 5, wherein each of said flappers is comprised of two substantially concentric annular portions of elastomeric material.

14. The beverage delivery system as recited in claim 13, wherein each of said flappers is comprised of a projection adapted to fit within a hole.

15. The beverage delivery system as recited in claim 14, wherein said flapper valve is comprised of at least one orifice adapted to receive said projection on said flapper.

16. The beverage delivery system as recited in claim 15, wherein said flapper valve is comprised of at least two orifices, each one of which is adapted to receive one of said projections on said flappers.

17. The beverage delivery system as recited in claim 16, wherein said system is comprised of a gas manifold which comprises at least about 90 weight percent of nonmetallic material.

18. The beverage delivery system as recited in claim 17, wherein at least about 90 weight percent of said fluid manifold is comprised of polyethylene.

19. The beverage delivery system as recited in claim 18, wherein at least about 90 weight percent of said flapper valve is comprised of polyethylene.

* * * * *